United States Patent
Wasko et al.

(10) Patent No.: US 7,788,604 B2
(45) Date of Patent: Aug. 31, 2010

(54) THREE STATE ICON FOR OPERATIONS

(75) Inventors: Timothy Wasko, High River (CA); Steven P. Jobs, Palo Alto, CA (US)

(73) Assignee: Apple, Inc., Cupertino, CA (US)

( * ) Notice: Subject to any disclaimer, the term of this patent is extended or adjusted under 35 U.S.C. 154(b) by 529 days.

(21) Appl. No.: 10/996,841

(22) Filed: Nov. 23, 2004

(65) Prior Publication Data

US 2005/0091614 A1   Apr. 28, 2005

Related U.S. Application Data

(63) Continuation of application No. 09/757,109, filed on Jan. 8, 2001, now Pat. No. 6,825,861.

(51) Int. Cl.
    *G06F 3/048*   (2006.01)
(52) U.S. Cl. .............. 715/837; 715/810; 715/814; 715/829; 715/861
(58) Field of Classification Search ........ 715/810–865, 715/763
    See application file for complete search history.

(56) References Cited

U.S. PATENT DOCUMENTS

| | | | |
|---|---|---|---|
| 5,500,936 A | | 3/1996 | Allen et al. |
| 5,574,843 A | * | 11/1996 | Gerlach, Jr. ............... 345/418 |
| 5,652,714 A | | 7/1997 | Peterson et al. |
| 5,664,216 A | | 9/1997 | Blumenau |
| 5,801,692 A | * | 9/1998 | Muzio et al. ............... 715/764 |
| 5,815,153 A | | 9/1998 | Isensee et al. |
| 5,841,959 A | | 11/1998 | Guiremand |
| 5,847,707 A | | 12/1998 | Hayashida |
| 5,862,395 A | * | 1/1999 | Bier ............................. 712/1 |
| 5,877,764 A | | 3/1999 | Feitelson et al. |
| 5,896,138 A | | 4/1999 | Riley |
| 5,905,496 A | | 5/1999 | Lau et al. |
| 6,097,390 A | * | 8/2000 | Marks ....................... 715/772 |
| 6,104,397 A | | 8/2000 | Ryan et al. |
| 6,239,800 B1 | | 5/2001 | Mayhew et al. |

(Continued)

OTHER PUBLICATIONS

McLean J; Pickover CA; Winarski D: "Access/Control Icons (Icon Keys)" IP.Com Journal, IP.Com Inc., West Henrietta, NY, US, Apr. 1, 1995, XP013103325 ISSN: 1533-0001 the whole document.

(Continued)

*Primary Examiner*—Ting Lee
*Assistant Examiner*—Ashraf Zahr
(74) *Attorney, Agent, or Firm*—Buchanan Ingersoll & Rooney, PC

(57) ABSTRACT

A three state icon for a computer is disclosed. The icon prevents inadvertent starting of an operation on a computer. The icon has a first state which conceals a second state. Upon selection of the first state with a computer pointing device (i.e., mouse), the icon will change to the second state. Upon selecting the icon in the second state, the operation on the computer will start. Accordingly, only upon selecting the icon in the first state and then the second state, the operation will commence on the computer thereby preventing accidental startup of the operation. Once the second state has been selected, the icon will change to a third state which indicates that the operation is proceeding on the computer.

31 Claims, 5 Drawing Sheets

U.S. PATENT DOCUMENTS 6,326,985 B1   12/2001  Tazoe et al.
6,484,189 B1*  11/2002  Gerlach et al. .............. 715/526
6,507,848 B1*   1/2003  Crosby et al. ............... 707/102
6,535,231 B1*   3/2003  Nix ............................ 715/835
6,567,075 B1*   5/2003  Baker et al. ................. 345/172

OTHER PUBLICATIONS

Supplementary Partial European Search Report in corresponding European Application No. 02 70 5709 dated Oct. 16, 2009.
International Search Report in corresponding International Application No. PCT/US02/00485 dated May 20, 2002.

* cited by examiner

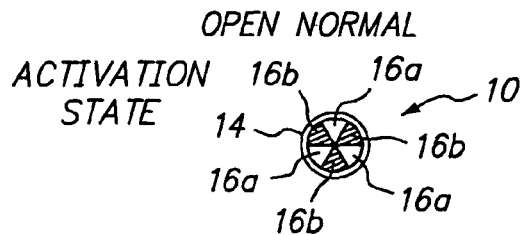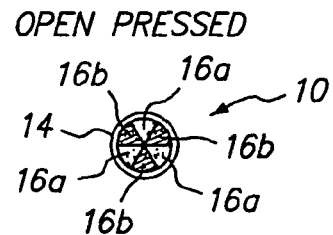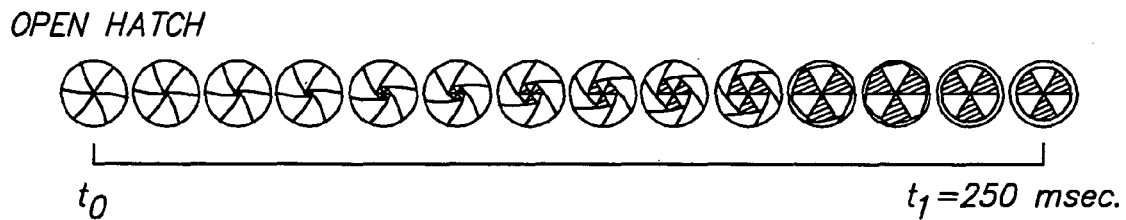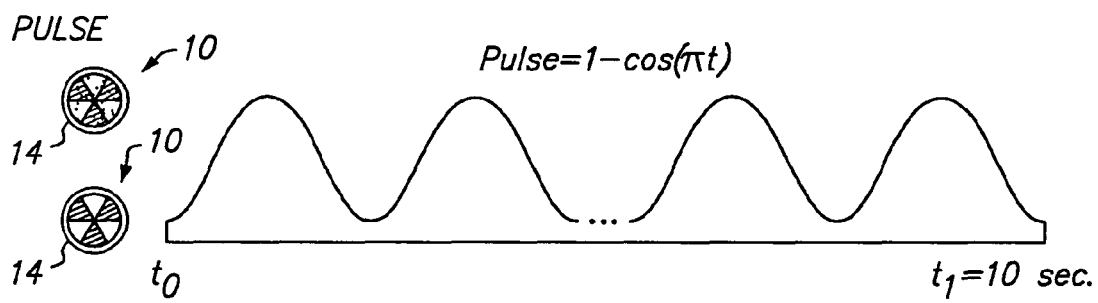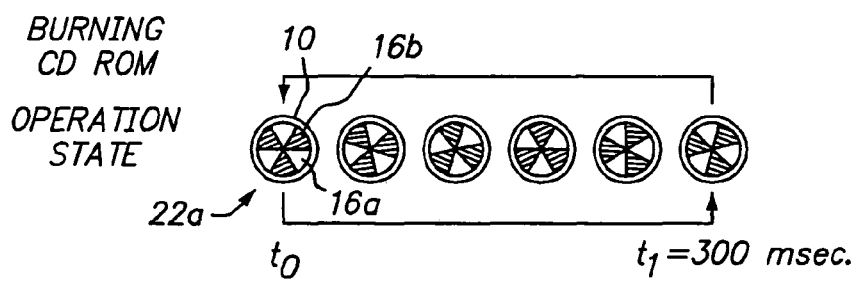

BURNING　　10　OPERATION
DVD-R　　　　　STATE

22b

AUTO-CLOSE PULSE　　　　Pulse=1−cos(2πt)

$t_0$　　　　　　　　　　　　$t_1 = 5$ sec.

CLOSE $t_0$　　　　　　　　　　　　$t_1 = 250$ msec.

THREE STATE ICON FOR OPERATIONS

RELATED APPLICATION

This application is a continuation of application Ser. No. 09/757,109 filed Jan. 8, 2001, the contents of which are incorporated herein by reference.

BACKGROUND OF THE INVENTION

The present invention generally relates to a method of initiating an operation on a computer, and more particularly to a method of using an icon having three states that prevents inadvertent startup of the operation.

A user interfaces with a computer using a graphical user interface. The user can initiate operations on the computer by pointing and clicking with a pointing device such as a mouse or stylus. Typically, by pointing the mouse at a certain location on the computer screen and then depressing a button on the pointing device, the user can initiate operations on the computer. The operations may be graphically represented by icons on the computer display. In this respect by selecting the icon with the pointing device, the user can start a desired operation on the computer.

In order to ensure that the operation to be performed by the computer is the correct operation, the computer will typically query the user if he or she wishes to proceed. If the user is performing a function which is non-recoverable (i.e., formatting a disc), the computer will display a dialog box on the display asking the user if he or she wishes to proceed. The user must respond to the query by the dialog box in order for the operation to commence. This permits the user to change his or her mind before the non-recoverable operation begins and ensures that the operation does not proceed inadvertently.

It will be recognized that initiating an improper operation on the computer can be costly in terms of both time and money. Recording medium may be recordable only once such that if a mistake is made while recording, then the medium will not be reusable. As such, before recording a DVD or CD-ROM it is imperative to determine that the user wishes to record on the medium in order to prevent mistakes which may become costly later on.

Once the operation commences, the computer will typically display a second dialog box which indicates the progress of the operation. The second dialog box may be a graphical representation of the progress of the procedure or function being performed by the computer. This alerts the user that the medium is being recorded so that the user will know the system's status.

It will be recognized that displaying a dialog box in order to ensure that inadvertent startup of the operation doesn't happen will add an extra step for the user. More specifically, the user must respond to the additional inquiry of the dialog box in order to ensure that the operation will proceed. Additionally, the inclusion of the dialog box creates an additional step for the computer to process such that valuable processing resources of the computer are used.

The present invention addresses the above-mentioned deficiencies in the prior art by providing a method to ensure that inadvertent operation of a computer operation is not performed. Additionally, the present invention provides a method whereby the status of an operation is displayed by the computer without the use of dialog boxes. In this respect, the present invention provides a three-state icon which prevents inadvertent operation of the computer and display the status of the operation.

BRIEF SUMMARY OF THE INVENTION

In accordance with the present invention, there is provided a system and method for performing an operation on a computer without the need for dialog boxes such that inadvertent startup of the operation is not possible. In this respect, the present invention provides an icon which has three states. The first state is a protective state which when selected (i.e., activated) changes to a second state. The selection of the first state does not perform any function of the computer, except to reveal the second state. Selection of the second state by the user, commences the desired operation on the computer. In this respect, when the user activates the second state, the operation will proceed on the computer. When the operation is proceeding on the computer, the icon will revert to a third state to show that the function is proceeding as desired.

In the preferred embodiment of the present invention the first state may be a graphical representation of an iris presented on the display of the computer. The second state may be a graphical representation of a button which is depressed by the user in order to start the operation. The iris will retract when activated from the first state to the second state. It will be recognized that the icon can be selected or activated via a pointing device of the computer such as a mouse. The icon is selected by positioning a pointer over the icon with the mouse and depressing the appropriate button on the mouse. When the operation on the computer is finished, the icon will revert back to the first state such that the user may proceed with the operation again.

In accordance with the present invention, there is provided a method of preventing accidental startup of a computer operation with an icon having a first, second and third states. The method comprises initially providing the icon in the first state. Next, the icon is activated in the first state to reveal the second state. Finally, the second state is activated in order to start the operation on the computer. Upon selection of the second state, the icon will change to the third state in order indicate that the operation is being performed on the computer. Finally, the icon will change back to the first state upon completion of the operation and the method may be repeated as needed by the user.

In accordance with the present invention there is provided a computer readable medium containing a program which implements a procedure to prevent inadvertent startup of an operation running on a computer. The computer readable medium comprises providing an icon in a first state and then activating the first state in order to reveal a second state. Next, the icon is activated in the second state in order to start the operation on the computer. The icon will revert to the third state when activated in the second state in order to show the status of the operation.

BRIEF DESCRIPTION OF THE DRAWINGS

These, as well as other features of the present invention, will become more apparent upon reference to the drawings, wherein:

FIGS. 3a and 3b are graphical representations of the three state icon in the second state;

FIG. 4 is a graphical representation of the three state icon transitioning from the first state to the second state;

FIG. 5 is a graphical representation of three state icon pulsing in the second state;

FIG. 6 is a graphical representation of the three state icon in the third state;

DETAILED DESCRIPTION OF THE INVENTION

Figure 1:
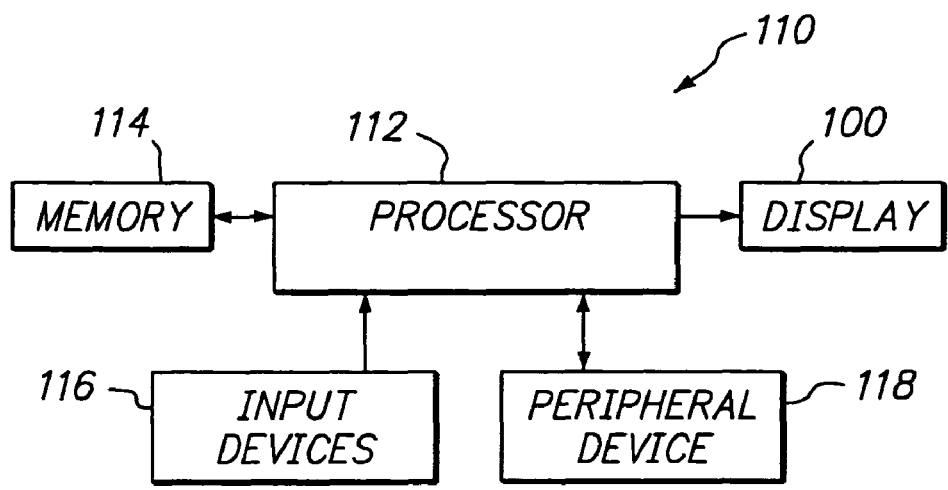
FIG. 1 is a system block diagram for a computer which displays the present invention.

Referring now to the drawings wherein the showings are for purposes of illustrating a preferred embodiment of the present invention only and not for purposes of limiting the same, FIGS. 2-9 illustrate a three-state icon 10 constructed in accordance with the present invention. The icon 10 is displayed by a graphical user interface on a display 100 of a computer 110, shown in FIG. 1. In this regard, the computer 110 is programmed to generate the icon 10 in accordance with the present invention. The computer 110 has a processor 112 in electrical communication with the display 100 that is operative to form the images thereon. Additionally, the computer 110 includes a memory 114 (i.e., RAM, ROM, DRAM, etc. . . . ) for storing information and an input device 116 for inputting information. The input device 116 may be a keyboard, mouse, pointing device, touchscreen, etc. . . . Additionally, the computer 110 may further include a peripheral device 118 which performs some critical, non-recoverable operation. In this regard, the peripheral device 116 may be a recordable DVD device or recordable CD-ROM device. Alternatively, the peripheral device 116 may be a storage device such as a tape or disc drive. In either instance, the peripheral device 116 may perform a critical operation that may not be recoverable if a mistake is made thereon. For example, if the peripheral device 116 is a recordable DVD player, the recording of mistaken information on the DVD may be expensive due to the cost of the recording medium (i.e., the DVD disc).

Figure 11:
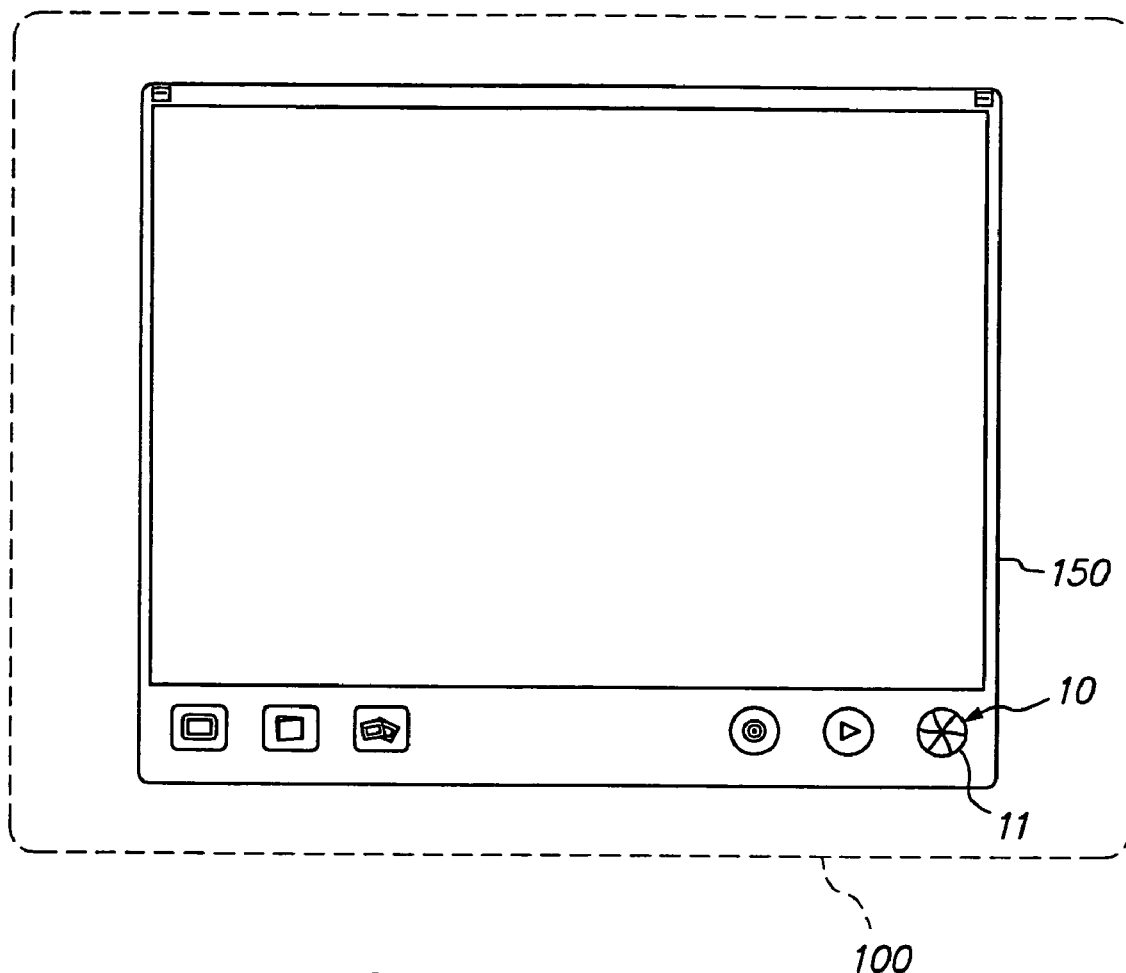
FIG. 11 is a screen shot of an application utilizing the three state icon of the present invention.

The icon 10 is used to inform the computer 110 to begin startup of a prescribed operation. Specifically, by selecting (i.e., activating) the icon 10 on the display 100 with an input device (i.e., mouse) 116 through the known point-and-click technique, it is possible to have the computer 110 start the desired operation. As seen in FIG. 11, the icon 10 may control the recording (i.e., burning) of a DVD and is responsible for commencing the recording of prescribed information onto a DVD through the use of an application 150 used for creating and organizing the content on the DVD. It will be recognized, that the present example of burning a DVD is illustrious only, and in no way limiting of the function of the icon 10. Typically, the icon 10 will be used to initiate critical operations on the computer 110 that are non-recoverable wherein the inadvertent starting of the operation may be catastrophic. Accordingly, the three-state icon 10 may be used in applications ranging from the recording of a CD/DVD, formatting a disc, or any other application wherein confirmation of proceeding should be made before beginning the operation.

Figure 2A:
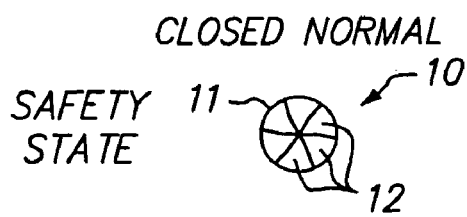
FIGS. 2a and 2b are graphical representations of the three state icon of the present invention in the first state.

Referring to FIG. 2a, the icon 10 is shown in a first or protective state 11. The first state 11 is a default state wherein the computer 110 will not begin the operation even though the icon 10 is selected. In this respect, the first state 11 can be thought of as a safety state wherein the operation cannot be directly started. In the present example, the icon 10 is shown as a graphical representation of an iris. The iris will open when selected by the user, as will be further explained below. When the icon 10 is in the first state 11, the iris has a plurality of leaves 12 in the closed position, as seen in FIG. 1a. Specifically, six leaves 12 are arranged in a spiral pattern wherein each leaf 12 is generally triangularly shaped. The apex of each of the leaves 12 meets at the center of the icon 10 when in the closed position of the first state 11. When the icon 10 is in the first state 11, access to the desired function of the computer 110 is not possible. Specifically, if the user selects the icon 10 while in the first state 11, the operation associated with the icon 10 will not begin. Accordingly, the first state 11 indicates that the computer 110 is not performing a function.

Figure 2B:
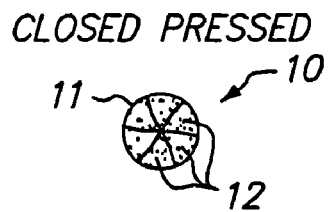

Upon selecting the icon 10 in the first state 11 by pressing the icon 10 with the computer mouse, the icon 10 will darken. Specifically; the leaves 12 of the icon 10 will change to a darker color, as seen in FIG. 2b. Immediately following therewith, the leaves 12 will transition into a retracted position, as seen in FIG. 4. Specifically, as seen in FIG. 4, the leaves 12 will retract toward the outer circumference of the icon 12 to gradually reveal the center of the icon 10 in a time frame of about 250 msec. The leaves 12 appear to retract by displaying the sequential images of the icon 10 in the order shown in FIG. 4. Each subsequent image presented on the display 100 will show each of the leaves 12 in a further opened position in order to show the iris retracting. As each of the images in FIG. 4 is displayed, the leaves 12 will appear to retract in one continuous movement until they each disappear from the icon 10 and fully reveal the second state 14 shown in FIGS. 3a and 3b. It will be recognized that the speed of retraction, and the number and type of leaves 12 can be varied depending upon the preference of the program designer.

When the leaves 12 of the iris are in a fully retracted position, (i.e., they are not visible), the icon 10 is in the second state 14 upon which the user can activate (i.e., start) the desired operation, as seen in FIG. 3a. The second state is an activation state wherein the operation can be activated with the icon 10. The second state 14 comprises three light colored pie shaped segments 16a, and three dark colored pie shaped segments 16b. The segments 16a and 16b alternate around the icon 10, as seen in FIG. 3a. When the icon 10 is in the second state 14, the segments 16a, 16b pulse to indicate that the first state 11 has been retracted and the second state 14 is active. Specifically, as seen in FIG. 5, the segments 16a, and 16b will slightly darken at an interval of $1-\cos(\pi t)$ for 10 seconds.

As the segments 16 pulse, the icon 10 is awaiting input from the user in order to begin startup of the operation associated with the icon 10. Specifically, in order to begin startup of the operation, the user will press the icon 10 with the pointing device (i.e., input device 116) to start the operation associated with the icon 10. The icon 10 is selected by pointing to the segments 16a, 16b with the mouse of the computer 110 and then clicking the appropriate button. Upon selecting the icon 10 while in the second state 14, the segments 16a, 16b will darken, as shown in FIG. 3b and the icon 10 will transition to a third state 22a or 22b, as will be further explained below.

If the user does not select the segments 16a, 16, within the ten second pulsing period beginning, the period of pulsing will increase. Specifically, referring to FIG. 8, the period of pulsing will increase to $1-\cos(2\pi t)$. The increased period of pulsing alerts the user that the second state 14 is revealed and active. It will be recognized that the rate of flashing may be varied by the designer. Accordingly, the icon 10 will pulse in the second state 14 for ten seconds at the slow rate, and for five seconds at the fast rate in order to inform the user that the icon 10 is active in the second state 14 and ready for selecting by the user.

If the user does not depress the segments 16a, 16b within the total 15 second time interval that the second state 14 is active, then the icon 10 will automatically revert back to the first state 11, thereby preventing the operation associated with the icon 10 from starting. Additionally, the icon 10 may be programmed such that if the user selects any portion outside of the segments 16a, 16b, the icon 10 will revert back to the first state 11, thereby preventing any inadvertent commencement of the operation controlled by icon 10.

Figure 7:
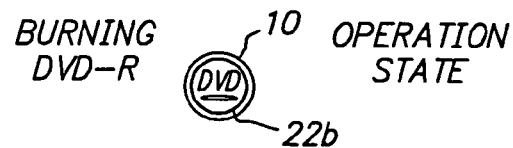
FIG. 7 is a graphical representation of the three state icon in an alternative configuration of the third state.
Figure 8:
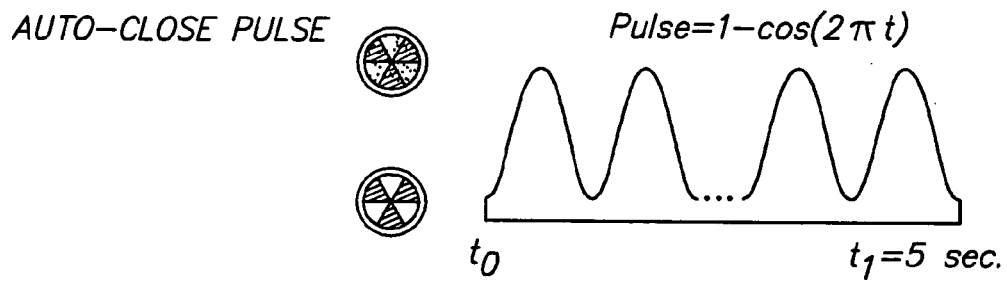
FIG. 8 is a graphical representation of the three state icon in a fast pulse of the second state.
Figure 9:
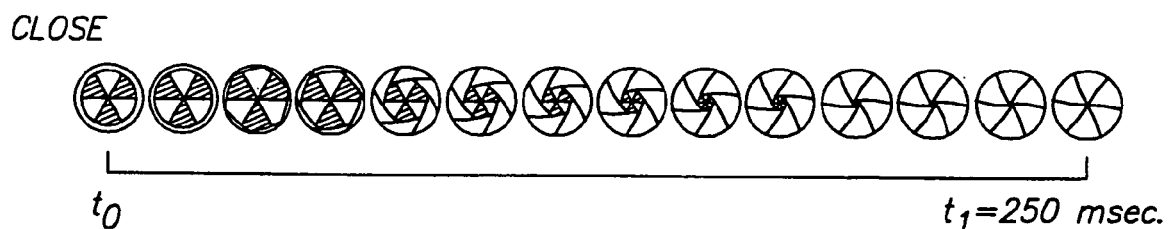
FIG. 9 is a graphical representation of the three state icon transitioning from the third state to the first state.
Figure 10:
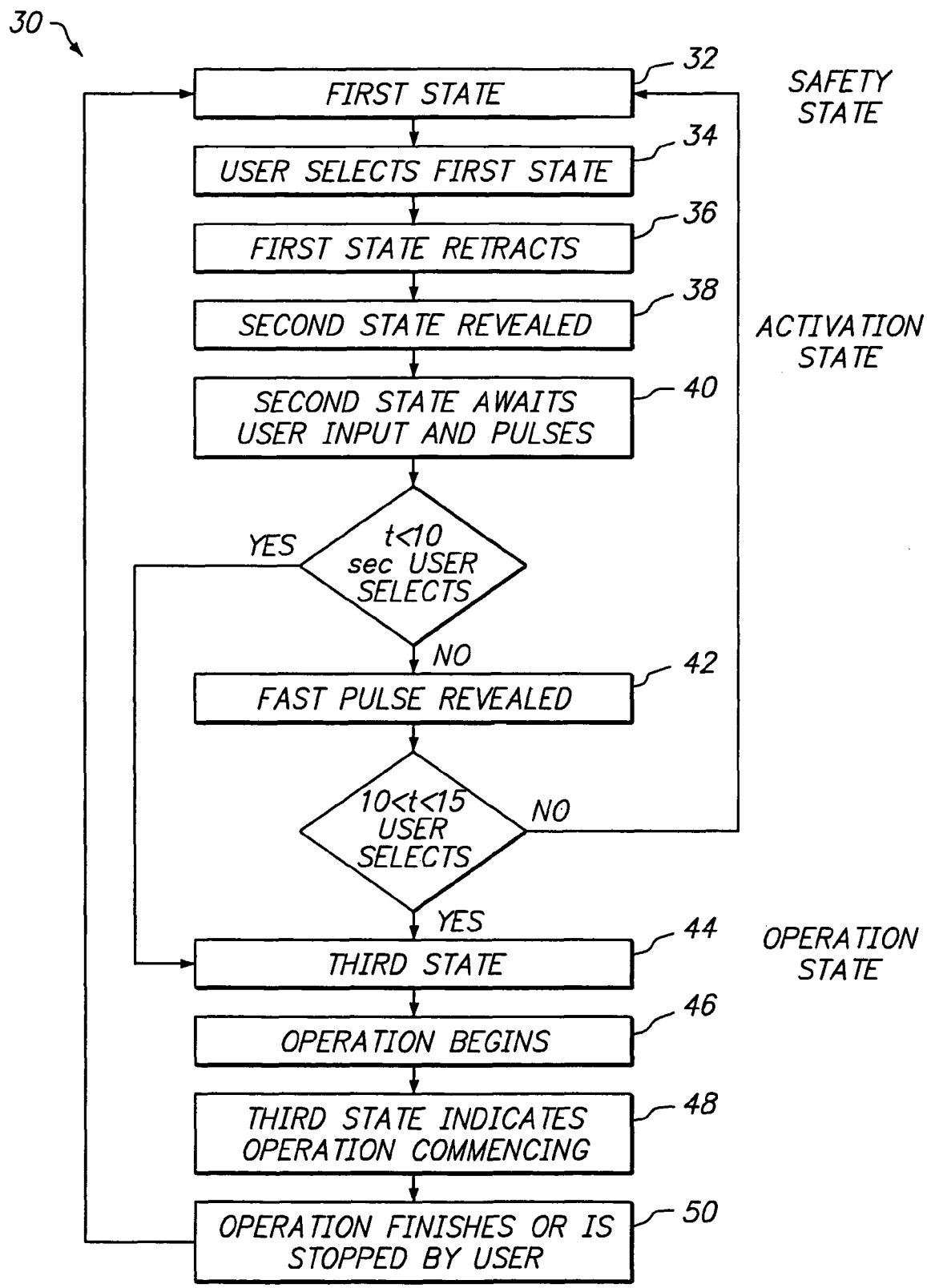
FIG. 10 is a flowchart depicting the operation of the three state icon of the present invention.

However, if the user depresses the segments 16a, 16b while the icon 10 is in the second state 14, the icon 10 will change to a third state 22a as shown in FIG. 6, if a CD-ROM is being recorded. Alternatively, if a DVD is being recorded, the icon 10 will revert to a third state 22b, as seen in FIG. 7. Both of the third states 22a and 22b are functionally similar, except that the image generated on the display 100 varies. The third state 22a or 22b indicates that the desired operation that the icon 10 controls is being performed by the computer 110. The third state 22a or 22b is an operation state that indicates the operation has started on the computer 110. While the icon 10 is in the third state 22a, the segments 16a, 16b will appear to be spinning. The appearance of spinning is achieved by continuously displaying the sequence of icons 10 in the order appearing in FIG. 6 within 300 msec and repeating the sequence as the operation is proceeding on the computer 110. As previously mentioned, if a DVD is being recorded, then the third state 22b indicates that the DVD is being recorded by changing the icon 10 to a DVD symbol in order to conserve system resources. It will be recognized that other indications that the operation is being performed by the computer 110 may also occur depending upon the preference of the designer. Upon completion of the operation or manual stopping of the operation by the user, the icon 10 will revert back to the first state 11 in order to prevent any inadvertent operation from occurring. Specifically, once the operation is finished, the leaves 12 of the iris will close thereby hiding either the third state 22a or 22b depending on the operation being performed. The leaves 12 will continually move toward the center of the icon 10 during the closing process, as seen in FIG. 9. Specifically, the sequence of images shown in FIG. 9 will be displayed within about 250 msec in order to change the icon 10 back to the first state 11.

It will be recognized by those of ordinary skill in the art that the graphical representation of the icon 10 may be changed according to the type of application. Accordingly, the examples above illustrate only one embodiment of the present invention, and multiple configurations are possible which are beyond the scope of the present application. For example, the first state 11 may be represented by a door which is opened upon selection, while the second and third states 14, 22a or 22b are graphical representations of the operation being performed. In this respect, the present invention provides for a first state 11 that prevents inadvertent operation of the function by concealing the second 14 and third states 22a,22b which are only revealed by selecting the first state 11.

Referring to FIG. 3, a flow chart 30 of the operation of the icon 10 is shown. In the preferred embodiment, the icon 10 begins in the first state 11, as shown in step 32. As previously mentioned for the present example, the leaves 12 of the icon 10 will be in the closed position when in the first state 11, and the icon 10 will be waiting to be selected by the user. Next, the icon 10 is selected by the user in step 34. Specifically, the user will use the input device 116 of the computer 110 to select the icon 10 while in the first state 11. The first state 11 is selected by pointing and clicking on the leaves 12 of the iris. When the icon 10 is selected, the first state 11 will retract, as seen in step 36. Specifically, the leaves 12 will retract toward the outer circumference of the icon 10, as previously described and shown in FIG. 4.

Upon retraction of the first state 11, then the second state 14 will be revealed, as seen in step 38. The second state 14 awaits selection by the user to start the operation the icon 10 controls and indicates that it is active by pulsing, as seen in FIG. 4. If the icon 10 is not selected within 10 seconds of the second state being revealed, then the icon 10 will revert to a fast pulse as seen in step 42. If the icon 10 is selected within ten seconds of the second state 14 being revealed, then the third state 22a or 22b is revealed, as shown in step 44.

After the fast pulse is revealed for 15 seconds, then the icon 10 will revert back to the first state 32. However, if the icon 10 is selected while the fast pulse is revealed, then the third state 22a or 22b will be revealed as seen in step 44. Additionally, if any other segment of the computer display 100 is selected while the icon 10 is in the second state 14, the icon 10 will revert to the first state 11. In this respect, if the user selects anything other than the icon 10 while in the second state 14, the icon 10 will revert to the first state 11. However, upon selection of the icon 10 in the second state 14, the icon 10 will change to the third state 22a or 22b, as shown in step 44. As previously mentioned above, the icon 10 is selected while in the second state 14 by pointing and clicking on the segments 16a, 16b with the computer input device 116.

When the icon 10 is in the third state 22a or 22b, the computer 110 is informed to begin the operation associated with the icon 10, as seen in step 46. For instance, in the present example, a DVD or a CD-ROM may be recorded. It will be recognized that other types of operations may begin depending upon the application which the icon 10 is programmed within. In addition to beginning the operation, the third state 22a or 22b will indicate that the operation is commencing on the computer 110, as seen in step 48. The icon 10, while in the third state 22a or 22b, can show the status of the operation, (i.e., the progress completed), in addition to showing that the operation is commencing.

Upon completion of the operation or the operation being manually stopped by the user, the icon 10 will revert back to the first state 11 so that the user may perform the operation again, if desired, as seen in step 50. It will be recognized that when the icon 10 is in the third state 22a or 22b, it may be advantageous to configure the icon 10 such that it is not possible to manually stop the operation from being performed. Alternatively, the icon 10 may be configured such that activation of the icon 10 while in the third state 22a or 22b permits the user to cease the operation.

Additional modifications and improvements of the present invention may also be apparent to those of ordinary skill in the art such as making the icon 10 into different graphical representations. Thus, the particular combination of parts described and illustrated herein is intended to represent only certain embodiments of the present invention, and is not intended to serve as limitations of alternative devices within the spirit and scope of the invention.

The invention claimed is:

1. An icon for a computer display that initiates an operation on a computer, the icon comprising:

a first configuration that is displayed on the computer display and selectable by a user to perform an operation on the computer, the operation on the computer being associated with the icon and separate from display operations of displaying multiple configurations of the icon on the computer display, the operation being restricted from being initiated while the first configuration is displayed;

a second configuration that is displayed on the computer display upon the selection of the first configuration and selectable by the user initiate execution of the operation on the computer, such that successive selections of the first and second configurations prevent inadvertent execution of the operation on the computer; and a third configuration that is displayed on the computer display upon the selection of the second configuration.

2. The icon of claim 1 wherein the first configuration is operable to retract to reveal the second configuration when selected by the user.

3. The icon of claim 1 wherein the second configuration reverts to the first configuration if the user does not select the second configuration.

4. The icon of claim 1 wherein the second configuration indicates that the second configuration is going to revert to the first configuration after a prescribed period of time has elapsed.

5. The icon of claim 4 wherein the second configuration pulses before the second configuration reverts to the first configuration.

6. The icon of claim 1 wherein the third configuration indicates that the operation is being executed on the computer.

7. The icon of claim 1 wherein the third configuration is selectable to cease execution of the operation on the computer.

8. A method of initiating an operation on a computer with an icon having multiple configurations, the method comprising the steps of:

displaying the icon in a first configuration on a display device of the computer;

selecting the icon in the first configuration in order to perform an operation on the computer, the operation being associated with the icon and separate from display operations of displaying the multiple configurations of the icon on the display device, and the operation being restricted from being initiated while the icon is in the first configuration;

displaying the icon in a second configuration on the display device upon the selection of the icon in the first configuration;

selecting the icon in the second configuration in order to initiate execution of the operation on the computer, such that successive selections of the first and second configurations prevent inadvertent execution of the operation on the computer; and displaying the icon in a third configuration on the display device upon the selection of the icon in the second configuration.

9. The method of claim 8 wherein selecting the first configuration of the icon reveals the second configuration by retracting the first configuration.

10. The method of claim 8 wherein the second configuration reverts to the first configuration if the user does not select the second configuration.

11. The method of claim 8 wherein the second configuration indicates that the second configuration is going to revert to the first configuration after a prescribed period of time has elapsed.

12. The method of claim 11 wherein the second configuration pulses before the second configuration reverts to the first configuration.

13. The method of claim 8 wherein the third configuration indicates that the operation is being executed on the computer.

14. The method of claim 8 wherein the third configuration is selectable to cease execution of the operation on the computer.

15. A computer-readable storage medium having a computer program stored thereon that causes a computer to display an icon, which has multiple configurations and which initiates an operation on the computer that is associated with the icon and separate from display operations of displaying the multiple configurations of the icon, the program causing the computer to execute the following steps:

detecting a selection of the icon in a first configuration;

restricting the operation from being initiated while the icon is in the first configuration;

displaying the icon in a second configuration in response to detecting the selection of the icon in the first configuration;

detecting a selection of the icon in the second configuration to initiate the operation on the computer;

initiating execution of the operation on the computer in response to detecting the selection of the icon in the second configuration, such that detecting successive selections of the first and second configurations prevents inadvertent execution of the operation on the computer; and displaying the icon in a third configuration upon initiation of the operation on the computer.

16. The computer-readable storage medium of claim 15 wherein the computer program causes the computer to reveal the second configuration of the icon by retracting the first configuration of the icon in response to detecting the selection of the icon in the first configuration.

17. The computer-readable storage medium of claim 15 wherein the computer program causes the computer to revert the second configuration to the first configuration if a selection of the second configuration is not detected.

18. The computer-readable storage medium of claim 15 wherein the second configuration indicates that the second configuration is going to revert to the first configuration after a prescribed period of time has elapsed.

19. The computer-readable storage medium of claim 18 wherein the computer program causes the computer to have the second configuration pulse before the second configuration reverts to the first configuration.

20. The computer-readable storage medium of claim 15 wherein the third configuration indicates that the operation is being executed on the computer.

21. The computer-readable storage medium of claim 15 wherein the third configuration is selectable to cease execution of the operation on the computer.

22. An icon for a computer display that initiates an operation on a computer, the icon comprising:

a first icon means that is displayed on the computer display and selectable by a user to perform an operation on the computer, the operation on the computer being associated with the icon and separate from display operations of displaying multiple configurations of the icon, the operation being restricted from being initiated while the first icon means is displayed;

a second icon means that is displayed on the computer display upon the selection of the first icon means and selectable by the user to cause initiation of execution of the operation on the computer, such that successive selections of the first and second icon means prevent inadvertent execution of the operation on the computer; and a third icon means that is displayed on the computer display upon the selection of the second icon means.

23. The icon of claim 22 wherein the first icon means is operable to retract to reveal the second icon means when selected by the user.

24. The icon of claim 22 wherein the second icon means reverts to the first icon means if the user does not select the second icon means.

25. The icon of claim 22 wherein the second icon means indicates that the second icon means is going to revert to the first icon means after a prescribed period of time has elapsed.

26. The icon of claim 25 wherein the second icon means pulses before the second icon means reverts to the first icon means.

27. The icon of claim 22 wherein the third icon means indicates that the operation is being executed on the computer.

28. The icon of claim 22 wherein the third icon means is selectable to cease execution of the operation on the computer.

29. A multi-state icon for a computer display that controls an operation on a computer, comprising:

a user-selectable first state displayed on the computer display and indicating selection of the operation, which is associated with the icon, separate from display operations of displaying multiple states of the icon on the computer display, and restricted from being activated while the icon is in the first state;

a user-selectable second state indicating activation of the operation and displayed on the computer display upon selection of the icon in the first state; and a third state indicating commencement of the operation and displayed on the computer display upon selection of the icon in the second state, wherein:
the icon in the first state, upon selection by a user, changes from the first state to the second state and activates the operation,
the icon in the second state, upon selection by a user, changes from the second state to the third state and commences the operation.

30. The multi-state icon of claim 29 wherein the icon in the second state, after a predetermined period of time without being selected, changes from the second state to the first state.

31. The icon of claim 29 wherein the icon in the third state, upon cessation of the operation, changes to the first state.

* * * * *

UNITED STATES PATENT AND TRADEMARK OFFICE
CERTIFICATE OF CORRECTION

PATENT NO. : 7,788,604 B2  Page 1 of 1
APPLICATION NO. : 10/996841
DATED : August 31, 2010
INVENTOR(S) : Timothy Wasko et al.

It is certified that error appears in the above-identified patent and that said Letters Patent is hereby corrected as shown below:

On the Title page, item (73) Assignee, change:

"APPLE, INC." to --APPLE INC.--.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,788,604 B2
APPLICATION NO. : 10/996841
DATED : August 31, 2010
INVENTOR(S) : Timothy Wasko et al.

It is certified that error appears in the above-identified patent and that said Letters Patent is hereby corrected as shown below:

In column 7, line 6, in claim 1, after "user" insert -- to --.

Signed and Sealed this
Fourteenth Day of June, 2011

David J. Kappos
*Director of the United States Patent and Trademark Office*